April 23, 1940.   K. SCHWENK   2,197,950
VEHICLE BODY
Filed Aug. 17, 1939    4 Sheets-Sheet 1

Inventor:
KURT SCHWENK
By: Richards & Geier
Attorneys:

April 23, 1940. K. SCHWENK 2,197,950
VEHICLE BODY
Filed Aug. 17, 1939 4 Sheets-Sheet 2
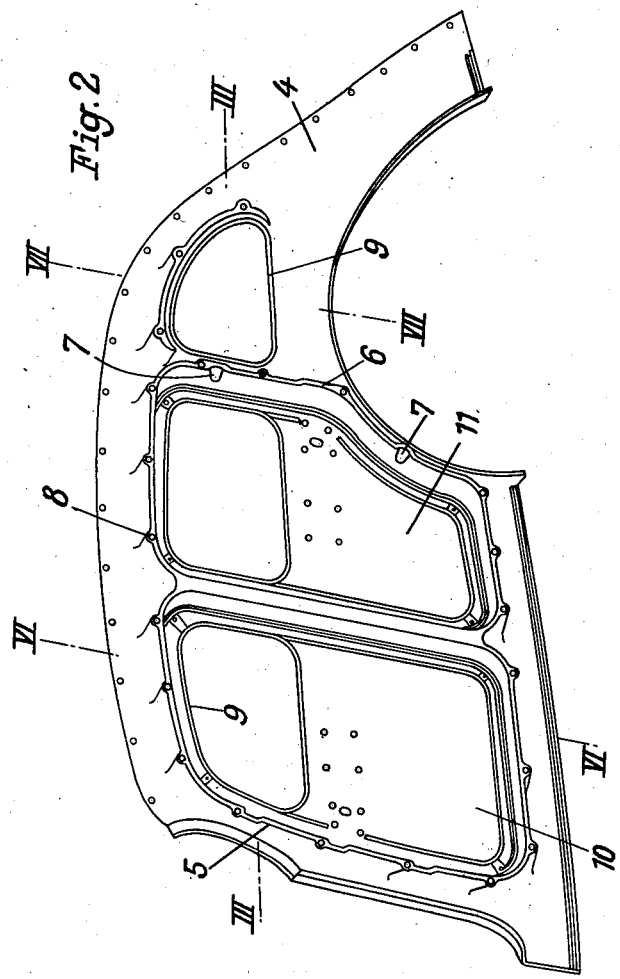
Inventor:
KURT SCHWENK
By: Richards & Geier
Attorneys

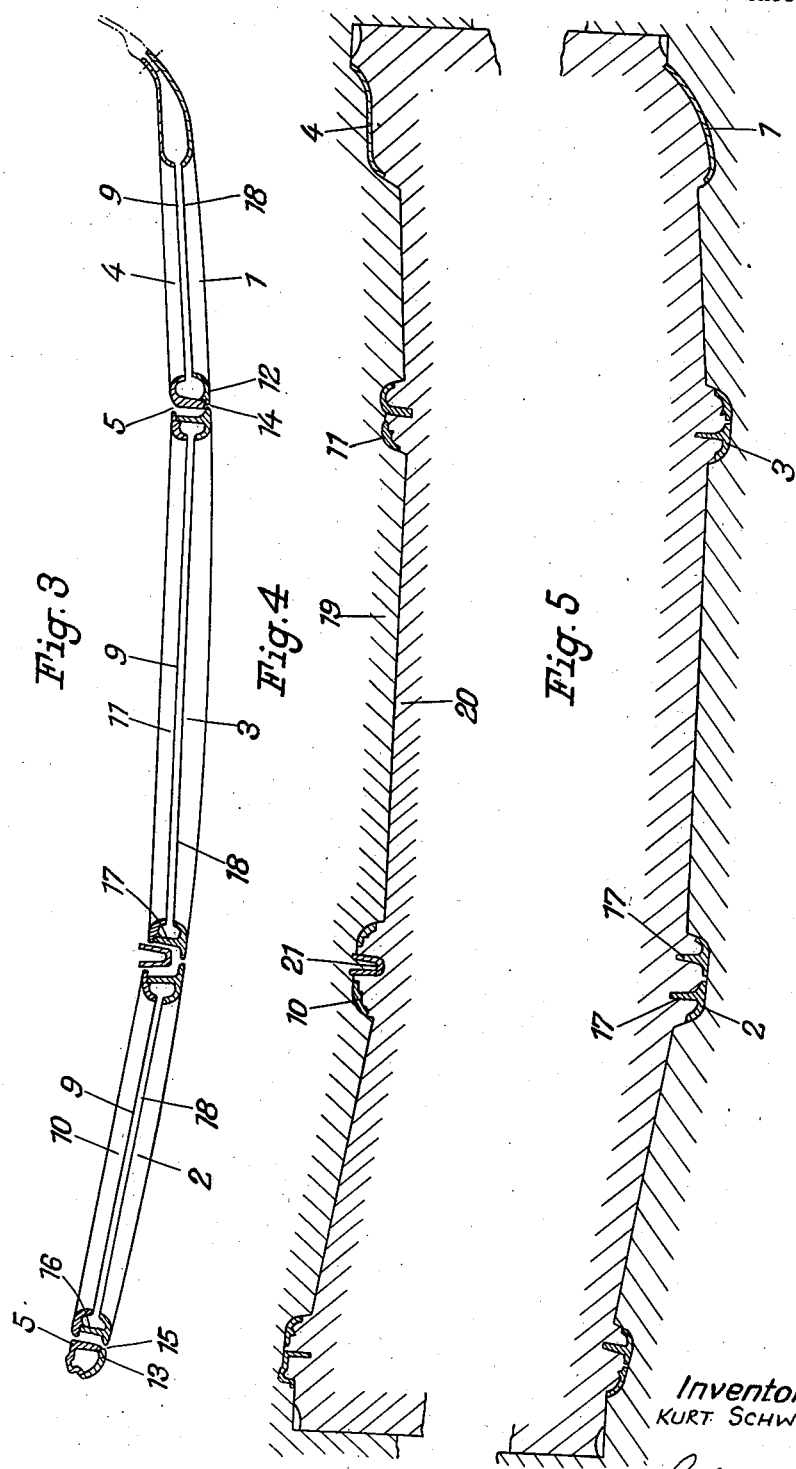

April 23, 1940.　　　　K. SCHWENK　　　　2,197,950
VEHICLE BODY
Filed Aug. 17, 1939　　　4 Sheets-Sheet 4
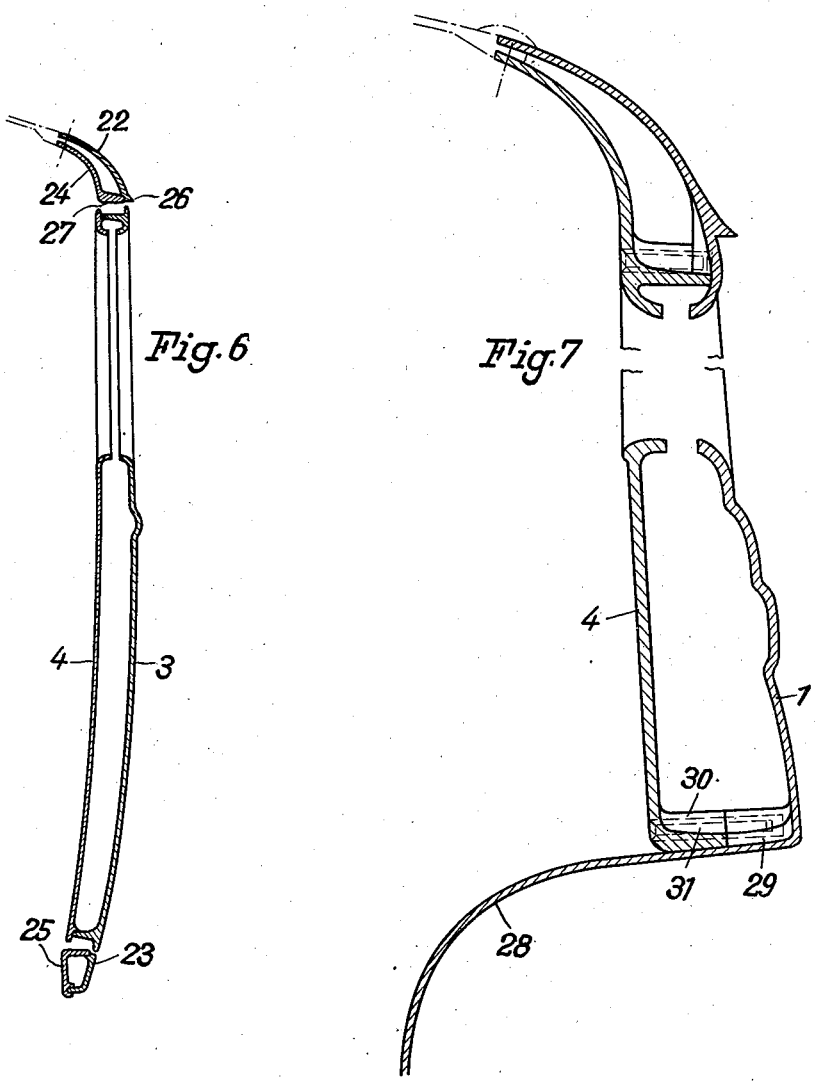
Inventor:
KURT SCHWENK
By: Richards & Geier
Attorneys:

Patented Apr. 23, 1940

2,197,950

UNITED STATES PATENT OFFICE 2,197,950

VEHICLE BODY

Kurt Schwenk, Zwickau, Germany, assignor to Auto Union Aktiengesellschaft, Chemnitz, Germany Application August 17, 1939, Serial No. 290,596
In Germany June 4, 1938

9 Claims. (Cl. 296—31)

This invention relates to vehicle bodies and has particular reference to the side walls of motor vehicle bodies, including side wall elements, doors and the like.

In sheet steel vehicle bodies it is known to provide a double wall structure for the side wall elements, doors and other parts of the body by assembling outer and inner sheet steel pressings. The manufacture of the doors and side wall members of such structures necessitates the use of separate tools for the inner metal sheet panels and the outer metal sheet panels. This is necessary on account of having to allow for the holding of the metal sheets.

In the case of vehicle bodies made of synthetic plastic materials, such as pressed synthetic resinous materials, in which no holding of metal sheets need be allowed for, the whole body side wall complete with doors can be made with the use of a single tool both for the outer wall elements and the inner wall elements, whereby the cost of purchase and maintenance of the tools is considerably reduced and, moreover, improved fitting of the parts on one another is obtained.

The manufacture of such vehicle bodies, however, gives rise to difficulties in regard to the apertured wall elements, for example the elements provided with or disposed adjacent the window and door apertures, because the necessary flanges provided on both the inner and outer wall members for connecting the inner with the outer wall lead to an undesirable accumulation of material which renders the pressing operation very difficult to carry out, especially if synthetic plastic materials are used which, as is necessary in the case of vehicle bodies, are of great strength and are therefore inherently difficult to press. Such synthetic plastic materials include primarily the laminated synthetic resinous materials, the starting material for which is constituted by superimposed layers of fibrous material saturated in synthetic resin.

The primary object of the present invention is to enable such accumulation of material at the framing parts of the side wall elements, that is to say, the parts adjacent apertures, to be avoided without affecting the enlarged cross-sections of such parts necessary to take up the high stresses and without necessitating an increase in the number of separate elements or pressings to be provided for a wall. This object is achieved, according to the invention, by providing a double walled vehicle body side wall of synthetic plastic material, the double wall being assembled of outer and inner pressings which have flanges integrally formed therewith and directed at an angle away therefrom, said flanges being formed alternately on the outer and inner pressings, that is to say, so that a flange on an inner pressing lies adjacent a flange on an outer pressing, not being the complementary outer pressing for such inner pressing, the flanges constituting means for connecting the inner and the outer pressings together. It will be seen that this alternate arrangement means that a flange on an inner or outer pressing will have no counterpart on the complementary outer or inner pressing.

It is a further object of the invention to enable the pressings, including door pressings, to be manufactured in a single pressing operation complete with the necessary flanges, this being carried out by making all the component inner pressings in a single press-tool and/or all the component outer pressings in another single press tool. The necessary separation of the component pressings from one another may be provided for by constructing the tool, to divide the pressings along the door gaps so that the pressings will lie in the press-tool in their proper relation corresponding to their relation when assembled. In the case of manufacture of the outer pressings in this manner the flanges on the pressing constituting the door and serving to connect it to the complementary inner door pressing is shaped to constitute the door jamb. Making the outer wall in this way enables a good alignment of the highest points of the curvature of the door and that of the adjacent body parts or pressings to be obtained. Furthermore, as the parts are in their proper relation when leaving the press no subsequent work is required for fitting the door in its aperture nor any subsequent straightening or other finishing operations. In the case of manufacture of the inner pressings in the above way the flanges formed integral therewith are shaped to constitute the door frame so that the latter formed on the inner wall surface can lie close to the door jambs formed on the outer wall surface without any unnecesary or undesirable accumulation of material occurring during manufacture of the pressings. The door frame thus formed can have its outer edge shaped to constitute the door rabbett which may have sharp edges resulting during assembly of the parts and without any further operation in sharp edged transitions as is required for satisfactory fitting of the parts adapted to be opened into the fixed parts.

Another object of the invention is to do away with the separately manufactured and subsequently inserted window frames which are necessary in all the known forms of vehicle bodies. According to the invention the window frames are formed in one with the inner pressings, both the door pressings and the adjacent fixed body pressings.

The inner door pressing, with advantage, has a rim formed in one therewith and projecting beyond the door jamb formed by the flange of the outer door pressing, the jamb thus being in the form of a groove which along the top of the door can serve to drain away rain when the door is open. To provide a satisfactory connection between the inner and outer pressings at the particularly dangerous place where the outer pressing is formed with a recess to accommodate the rear road wheel, reinforcement is provided above said recess on said outer pressing.

The invention is illustrated in the accompanying drawings which show an example of a construction made in accordance with the invention and with reference to which a method of manufacturing same will also be described, it being understood, however, that the invention is not limited to the example shown and may be carried out in various other ways within the ambit of the appended claims.

In the drawings:

Fig. 2 is a perspective view of the complementary inner side wall composite pressing;

Fig. 3 is a sectional elevation of an outer and inner wall assembled to form a double-walled side wall, the section being taken on the line III—III of Figs. 1 and 2;

Fig. 4 is a cross-sectional elevation of part of the press-tool for the inner wall, the section being taken on the same line as Fig. 3 with the composite pressing shown in position in the tool;

Fig. 5 is a corresponding cross-sectional elevation of the tool for the outer composite pressing which is shown in position therein;

Fig. 6 is a vertical cross-section elevation of the assembled side wall, the section being on the line VI—VI of Figs. 1 and 2; and Fig. 7 is another vertical sectional elevation of the assembled side wall on the line VII—VII of Figs. 1 and 2.

Figure 1:
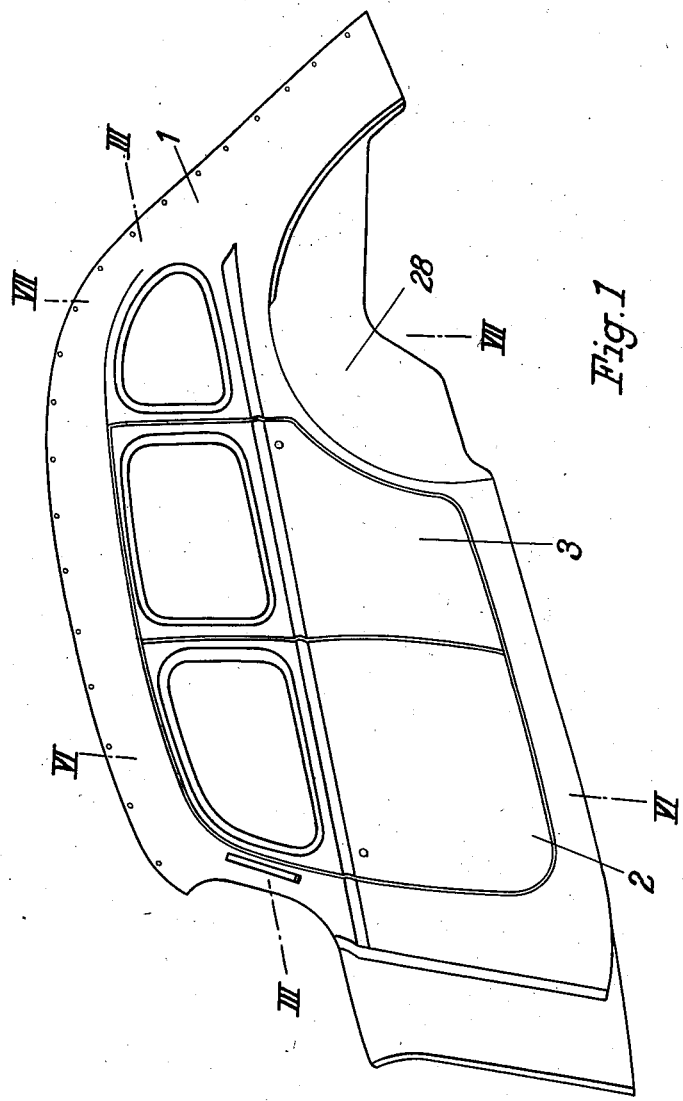
Fig. 1 is a perspective view of an outer side wall pressing or composite pressing of an automobile body.

Referring first to Fig. 1 a supporting outer side wall pressing 1 is made of one piece from the scuttle to the rear portion, doors 2 and 3 being pressed with the side wall pressing 1 in the same operation. The material of which these parts as well as the parts to be described further below are made is strong and highly elastic synthetic plastic material such as, in the present case, a superimposed layers of fibrous material saturated in synthetic resin, or instead of such fibrous material as fabric or paper, substances containing fibre fillers with the fibres unidirectionally aligned which makes for great strength and can be effected by depositing the fillers on a sieve mould whereby a preliminary pressing is produced which, saturated with synthetic resin, is subjected to a finishing pressing operation.

Referring now to Fig. 2 an inner supporting side wall pressing 4 complementary to the outer side wall pressing 1 is formed in like manner as the latter, but has inwardly projecting flanges 5 vertical to the plane of the pressing 4 formed in one therewith to serve as a door frame, all the necessary constructional and ornamental detail such as depressions and projections formed in the pressing operation, for example, recesses 6 to receive the door hinges and recesses 7 to receive the usual elastic door buffers. These flanges 5 serve to connect the inner wall pressing 4 to its complementary outer pressing 1, for which purpose they are provided with holes 8, likewise formed in the pressing operation, which serve to receive connecting bolts or screws. Window frames 9 surrounding the window apertures in the two doors and in the side wall pressing are likewise moulded in one with the pressing 4 and inner door pressings 10 and 11 which are complementary to the outer door pressings 2 and 3. Each of the composite pressings 1, 2, 3 and 4, 10, 11 is pressed complete in a hydraulic press after which the parts adapted to be opened, such as the door pressings are either cut out of the pressing 1 or 4 or else the separation thereof from the supporting side wall pressings is effected by the tools themselves as will be hereinafter more fully described.

Fig. 3 shows the complete side wall assembled of the outer and inner pressings, the outer side wall pressing 1 being without flanges at the parts or edges 12 and 13 surrounding the door apertures whilst the inner pressing 4 has the flanges 5 formed thereon which surround the door apertures and are joined in the middle to form the central door post 21 which is of V-section. The flanges 5 thus form the door frames, their outer edges 14 and 15 constituting at the same time the door rabbetts which with the adjacent edges of the outer pressings 1 form sharp cornered transitions. The outer door pressings 2 and 3 have flanges 16 and 17 formed in one therewith which constitute the door jambs and at the same time serve to connect thereto the inner door pressings 10 and 11, which have no complementary flanges but are formed with a rim extending all round and projecting beyond the flanges 16 and 17 with which they form a groove serving at the top of the door to drain away rain water when the door is in the open position. This can be seen more clearly from Fig. 6. The inner pressings have the window frames 9 formed thereon, as already stated, and complementary ledges 18 are provided on the outer pressings 1, 2, and 3.

Fig. 4 shows the manner of manufacturing the composite inner pressing 4, 10 and 11 which is seen in position in the press tool necessary for this purpose which consists of an upper die 19 and a lower die or matrice 20 it can be seen from this that the V-section or U-section door post 21 is made integral with the pressing 4. The cross-section of the door post 21 is made large enough to enable a heating channel which is necessary for heating the die 19 to be just accommodated therein. The whole inner side wall is pressed under heat in a single operation, the dies being so constructed that gaps equal to the width of the door gaps, i. e., the gaps between the door jambs and door frames are formed to separate the door pressings from the side wall pressing 4, the composite pressing 4, 10, 11 being thus arranged in the tool with its component pressings in the proper relation in which they are when assembled.

Fig. 5 similarly shows the tool for manufacturing the outer pressings 1, 2 and 3, the flanges 17 forming the door jambs of the two door pressings 2 and 3 being spaced so far apart that a detrimental accumulation of material is avoided. For the rest the pressing operation is similar to that according to Fig. 4 and the door pressings are separated from the side wall pressing 1 in like manner.

The side wall members 1 and 4 have roof portions 22 and floor portions 23 connected with complementary portions 24 and 25 respectively, to form the top and bottom framing for the doors. This is more clearly shown in Fig. 6, from which it will also be seen that the part 22 has a ledge 26 moulded thereon and integral therewith which serves for draining the rain and therefore extends substantially the whole length of the side wall above the doors and windows. The upper part 27 of the door frame, which is a part of the flanges 5 is made integral with the inner roof portion 24 which forms part of the inner side wall pressing 4.

Fig. 7 shows the manner of connecting the outer pressing 1 to the inner pressing 4 above the recess 28 for the rear road wheel which is formed in one with the pressing 1, as can also be seen from Fig. 1. The pressing 1 has a reinforced thickened portion 29 above the wheel recess and extending around the same, the portion 29 serving for connection to a complementary reinforced portion 30 on the inner pressing 4 as can be seen from Fig. 2. Fig. 7 also shows that the connection is by means of screw bolts 31 which lie flush and completely concealed in the pressings passing through the reinforced portions.

Such screw bolts are preferably used in all places where inner and outer pressings are to be connected together such as, for example, in the holes 8 and elsewhere.

What I claim and desire to secure by Letters Patent is:

1. A vehicle body side wall of synthetic plastic material comprising outer and inner pressings of said material forming a double-walled structure, and flanges on said pressings directed at an angle with respect to one face thereof and integral therewith, said flanges being formed alternately on the outer and inner pressings and constituting means for connecting the inner and outer pressings together.

2. A vehicle body side wall of synthetic plastic material comprising outer and inner pressings of said material forming a double-walled structure, said outer pressings including an outer door pressing and an adjacent body pressing formed in a single pressing operation and said inner pressings including an inner door pressing and an adjacent body pressing likewise formed in a single pressing operation, and flanges on said pressings directed at an angle with respect to one face thereof and integral therewith, the said flanges being formed on the outer and inner pressings alternately and constituting means for connecting said pressings together.

3. A vehicle body side wall of synthetic plastic material comprising outer and inner pressings of said material forming a double-walled structure, said outer pressings including an outer door pressing and an adjacent body pressing formed in a single pressing operation, flanges on said outer door pressings directed at an angle with respect to one face thereof and integral therewith and shaped to constitute the door jamb, and said inner pressings including an inner door pressing and an adjacent body pressing formed in a single pressing operation, and flanges on said inner body pressing directed at an angle with respect to one face thereof and integral therewith and shaped to constitute the door frame, all of said flanges constituting means for connecting said inner pressings with said outer pressings.

4. A vehicle body side wall of synthetic plastic material comprising outer and inner pressings of said material forming a double-walled structure of said side wall, flanges on said pressings directed at an angle with respect to one face thereof and integral therewith, said outer pressings including an outer door pressing and an adjacent body pressing formed in a single pressing operation, the flanges on said outer door pressing being shaped to constitute the door jamb, and said inner pressings including an inner door pressing and an adjacent body pressing formed in a single pressing operation, the flanges on said inner body pressing being shaped to constitute the door frame and to form door frame rabbetts with adjacent edges of said outer body pressing, all of said flanges being formed alternately on the outer and inner pressings and constituting means for connecting said pressings together.

5. A vehicle body side wall of synthetic plastic material comprising outer and inner pressings of said material forming a double-walled structure, and flanges on said pressings integral therewith and directed at an angle with respect to one face thereof, said inner pressings embodying window frame parts formed in one therewith and said flanges being formed alternately on the outer and inner pressings and constituting means for connecting said outer pressings with said inner pressings.

6. A vehicle body side wall of synthetic plastic material comprising outer pressings and inner pressings of said material assembled to form a double-walled structure of said side wall, inwardly directed flanges on said pressings integral therewith, said outer pressings including an outer door pressing an an adjacent outer body pressing formed in a single pressing operation, the flanges on said outer door pressing being shaped to constitute the door jamb, and said inner pressings including an inner door pressing and an adjacent inner body pressing formed in a single pressing operation, and a rim on said inner door pressing projecting over the flanges on said outer door pressing, whereby said door jamb is formed of groove-shape, all said flanges being formed alternately on the outer and inner pressings and constituting means for connecting said pressings together.

7. A vehicle body side wall of synthetic plastic material comprising outer and inner pressings of said material to constitute a double-walled structure, flanges on said pressings inwardly directed at an angle with respect to one face thereof and integral therewith, said outer pressings including at least one outer door pressing and an adjacent outer body pressing, said outer body pressing embodying a recess for a rear road wheel, and reinforcements of said outer body pressing positioned above and around said wheel recess to co-operate with the flanges on an inner pressing, all said flanges being formed alternately on the outer and inner pressings and constituting means for connecting said pressings together.

8. A method of manufacturing the side wall of a double-walled vehicle body, consisting in forming the outer and inner walls of pressings of synthetic plastic material, said outer wall embodying at least one outer door pressing and an adjacent outer body pressing, and said inner wall embodying at least one inner door pressing and an adjacent body pressing, each of said walls being completely formed in a single pressing operation.

9. A method of manufacturing the side wall of a double-walled vehicle body, consisting in forming the outer wall and the inner wall of pressings of synthetic plastic material, said outer wall embodying two outer door pressings and an adjacent outer body pressing, and said inner wall embodying two inner door pressings and an adjacent inner body pressing, each of said walls being completely formed in a single pressing operation by a press tool constructed to separate the door pressings from the body pressing of the wall along the door gaps.

KURT SCHWENK.